United States Patent [19]

Masclet

[11] 4,241,814
[45] Dec. 30, 1980

[54] MECHANICAL-HYDRAULIC DAMPER FOR A LOAD SUBJECT TO SHOCKS AND VIBRATIONS

[75] Inventor: Jean Masclet, Paris, France

[73] Assignee: Messier-Hispano-Bugatti, Montrouge, France

[21] Appl. No.: 886,347

[22] Filed: Mar. 14, 1978

[30] Foreign Application Priority Data

Mar. 16, 1977 [FR] France ............................ 77 07826
Apr. 27, 1977 [FR] France ............................ 77 12850

[51] Int. Cl.² ............................................. F16D 57/06
[52] U.S. Cl. ................................. 188/266; 74/89.15; 74/424.8 R; 92/31; 188/290; 188/292; 188/322
[58] Field of Search ............ 188/290, 292, 293, 296, 188/322, 266; 74/89.15, 424.8 R, 424.8 B; 92/31

[56] References Cited

U.S. PATENT DOCUMENTS

| 465,953 | 12/1891 | Stuck | 188/290 |
|---|---|---|---|
| 1,960,089 | 5/1934 | Rabb | 74/89.15 |
| 2,106,493 | 1/1938 | Byers | 188/292 |
| 2,532,656 | 12/1950 | Backus, Jr. et al. | 188/322 X |
| 2,688,951 | 9/1954 | Sears | 92/31 X |
| 2,724,284 | 11/1955 | Anderson et al. | 74/89.15 X |
| 3,501,114 | 3/1970 | Plante | 74/89.15 X |
| 3,756,351 | 9/1973 | Sasaki | 188/129 X |
| 3,824,905 | 7/1974 | Jablonsky | 74/89.15 X |

FOREIGN PATENT DOCUMENTS 512983 8/1952 Belgium .................................... 188/290
975100 10/1950 France ....................................... 188/292

Primary Examiner—George E. A. Halvosa
Attorney, Agent, or Firm—Scully, Scott, Murphy & Presser

[57] ABSTRACT

A mechanical-hydraulic damper for a load which is subject to shocks and vibrations, comprising a co-operating pair of elements, the first of the pair of elements being mounted in a body for relative axial movement in relation to the body and the second of the pair of elements being rotatably mounted in the body and so coupled to the first element that relative axial movement of the first element causes rotation of the second element which is coupled to a hydraulic system which resists sudden or rapid rotation of the second element. The pair of co-operating elements may comprise a screw-nut assembly. The hydraulic system may comprise a reversible pump driven by the rotatable element and pumping hydraulic fluid round a closed circuit including a throttling orifice. Alternatively the hydraulic system may comprise a rotary laminar hydraulic damper filled with high viscosity oil.

8 Claims, 12 Drawing Figures

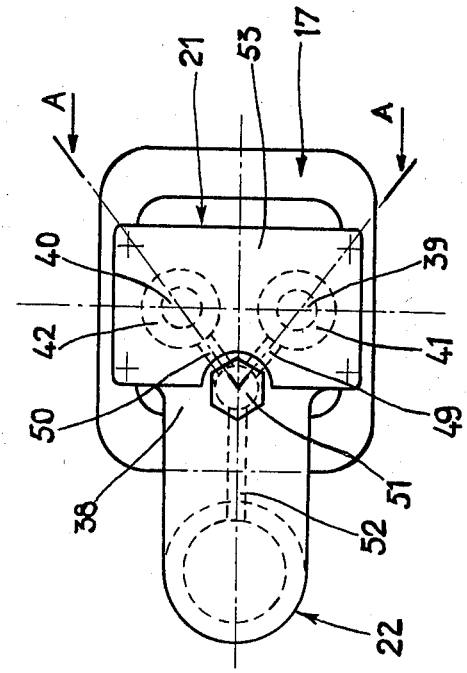
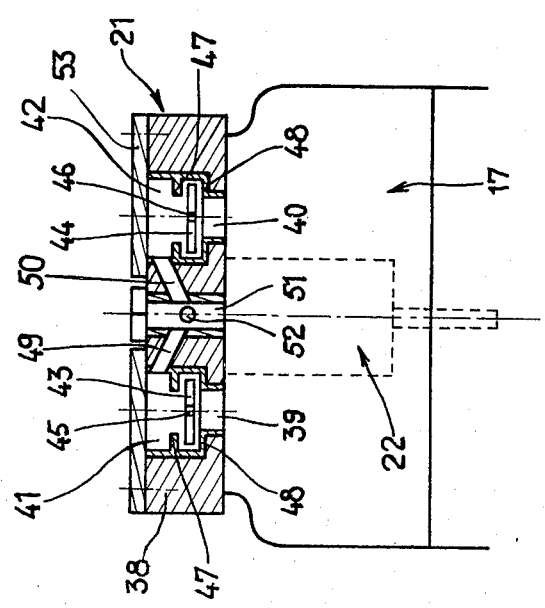

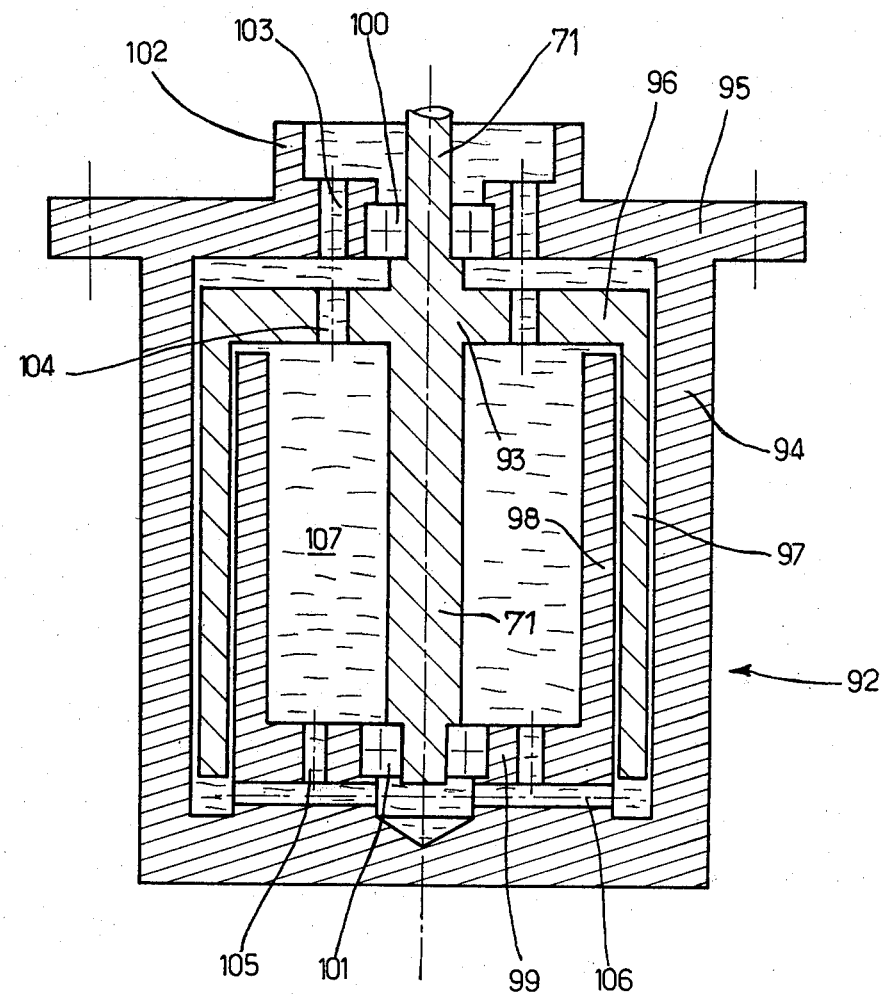

MECHANICAL-HYDRAULIC DAMPER FOR A LOAD SUBJECT TO SHOCKS AND VIBRATIONS

The present invention relates to a mechanical-hydraulic damper for a load which is subject to shocks and vibrations.

It is known that in plant having suspended pipe work or suspended loads of any kinds, for example in nuclear installations or measuring platforms, the loads have to be suspended or articulated to permit of slow deformation, for example of thermal origin, or these loads themselves or of elements adjacent to them.

Furthermore, it is frequently necessary dynamically to stabilise the said loads in order to protect them and their adjacent elements when the mechanical environment level becomes too high, as is the case for example in the event of earthquakes, explosions or breakage of elements.

For this purpose, dampers have already been proposed which are intended to be interposed between a suspended or an articulated load and a solid support and which are capable of elongation of retraction to oppose small amounts of stress occurring in the event of slow movements due for example to thermal deformations of elements adjacent to the load, and opposing considerable strain in the event of sudden external and possibly alternating stresses, in order dynamically to stabilise the load.

Previously proposed dampers fall into two categories. The first category relates to a hydraulic damper, an example of which is described in our published French Pat. No. 2 286 981. This hydraulic damper has serious drawbacks which are on the one hand due to the not insubstantial likelihood of hydraulic leakages, having regard to the use of a plurality of dynamic seals in the shock absorber, on the other, and above all a lack of rigidity in the entire apparatus, which is due to the presence of a considerable volume of hydraulic fluid since the greater the volume of hydraulic fluid it contains, the less opposition the hydraulic damper will offer to resonance phenomena.

The second known category relates to a mechanical damper which utilises considerable masses of inertia, capable of being caused to rotate by transformation of a linear displacement, but this mechanical shock absorber has one major drawback which is that it does not provide any limitation of the speed of displacement under the action of abnormally high stresses.

This invention has among its objects to provide a damper for a load which is subject to shocks and vibrations, offering only a small amount of stress, resisting slow, such as thermal, deformations, but setting up a blocking reaction against displacements which develop under the effect of considerable acceleration, such as shocks or vibrations, making it possible to limit the speed of the displacement under the effect of abnormally high stresses and, also offering a high degree of rigidity under stress.

According to the invention, there is provided a mechanical-hydraulic damper for a load which is subject to shocks and vibractions, comprising a co-operating pair of elements, one of said pair of elements being mounted in a body for relative axial movement in relation to the body and the other of said pair of elements being rotatably mounted in the body and so coupled to said one of said elements that said relative axial movement of said one of the elements causes rotation of said other of the elements, said other of the elements being coupled to hydraulic means which resist sudden or rapid rotation of said other of the elements.

Said pair of elements advantageously comprise a screw and a nut but may comprise other means, for example a rack and pinion.

Preferably, said other element which is mounted to rotate is coupled to drive means to cause flow of hydraulic fluid around a closed hydraulic circuit which is of small capacity and which is carried by the body, the rate of flow of fluid being restricted by a calibrated orifice. Any displacement of said one of the elements of the screw-nut assembly which is caused to perform an axial movement is transformed by the other of the elements into a rotation which drives the hydraulic means, the damping produced at the calibrated orifice being additional to the inertial damping which results from the said pair of mechanical elements.

It is convenient for the drive means of the hydraulic circuit to be a reversible pump, for example a gear pump, a vane pump or an axial piston pump, delivering into the calibrated orifice which is preferably constituted by reversible control valve, communicating with a reservoir containing hydraulic fluid and the outlet of which is looped to the pump intake.

Various types of control valve may be used, for example needle valves, static valves, diaphragm or plate valves, provided that they have a calibrated aperture constituting a throttling orifice through which the passage of hydraulic fluid gives rise to a hydraulic damping action, which may advantageously be chosen as proportional to the square on the rate of circulation of the hydraulic fluid, this being itself proportional to the speed of travel of the element of the screw-nut assembly which moves, by the use of additional throttling orifices.

For this purpose, a symmetrical valve may be chosen, comprising at each end a flat valve mounted to float between two abutments and provided with a central throttling orifice, the central part of the valve being in communication with the reservoir of hydraulic fluid.

With regard to driving of the pump, this may be effected directly by the said other element which is mounted to rotate in the body, or through gears, for example bevel gears, right-angled gearing or spur gears, according to the disposition which it is desired that the pump have in relation to the body.

In order to deal with the opposing torque which tends to rotate said one of the elements of the screw-nut assembly to which an axial movement is imparted, it is necessary to provide a guidance arrangement in relation to the body; this may be achieved for example by means of a guide, a key and key way or a caliper.

It is likewise advantageous for the screw of the screw-nut assembly to be a screw of the ball or roller type, and for the nut to be rigid with a sleeve via which the hydraulic receiver will be driven if the nut is mounted to rotate in the body, or guidance in relation to the body will be assured if the nut is mounted for axial movement with respect to the body.

In another embodiment of the invention, the hydraulic means may comprise a rotary laminar flow hydraulic damper comprising a rotor having at least one surface of revolution which, at a small spacing filled with a hydraulic fluid, lies adjacent at least one fixed surface, any displacement of said one of the elements of the screw-nut assembly which is driven with an axial movement being transformed by said other of the elements into a rotation to drive the rotor, the hydraulic fluid in known manner opposing relative movements of rotation of the surface to produce hydraulic damping to supplement the mechanical inertial damping.

This form of embodiment has the advantage of having a very simplified hydraulic circuit and of providing hydraulic damping which is directly proportional to the speed of displacement of the screw-nut assembly.

In a very simple and well adapted form of embodiment, the rotor can take the form of a cylindrical drum mounted to rotate in a likewise cylindrical chamber, the walls of which are rigid with the body, the flow of hydraulic fluid occurring between the outer lateral surface of the drum and the inner lateral surface of the chamber.

Advantageously, the cylindrical dum is hollow and, with a slight gap, encloses a sleeve rigid with the walls of the chamber, so that the flow of hydraulic fluid occurs likewise between the inner lateral surface of the drum and the outer lateral surface of the sleeve, the cylindrical chamber constituting a reservoir of hydraulic fluid.

The invention is diagrammatically illustrated by way of example in the accompanying drawings, in which:

FIG. 4 is a plan view of the hydraulic assembly of the damper shown in FIG. 3;

FIG. 5 is a cross-sectional view taken on line A—A of FIG. 4;

FIG. 12 is a section through the hydraulic assembly of the damper shown in FIG. 11.

Figures 1, 2:
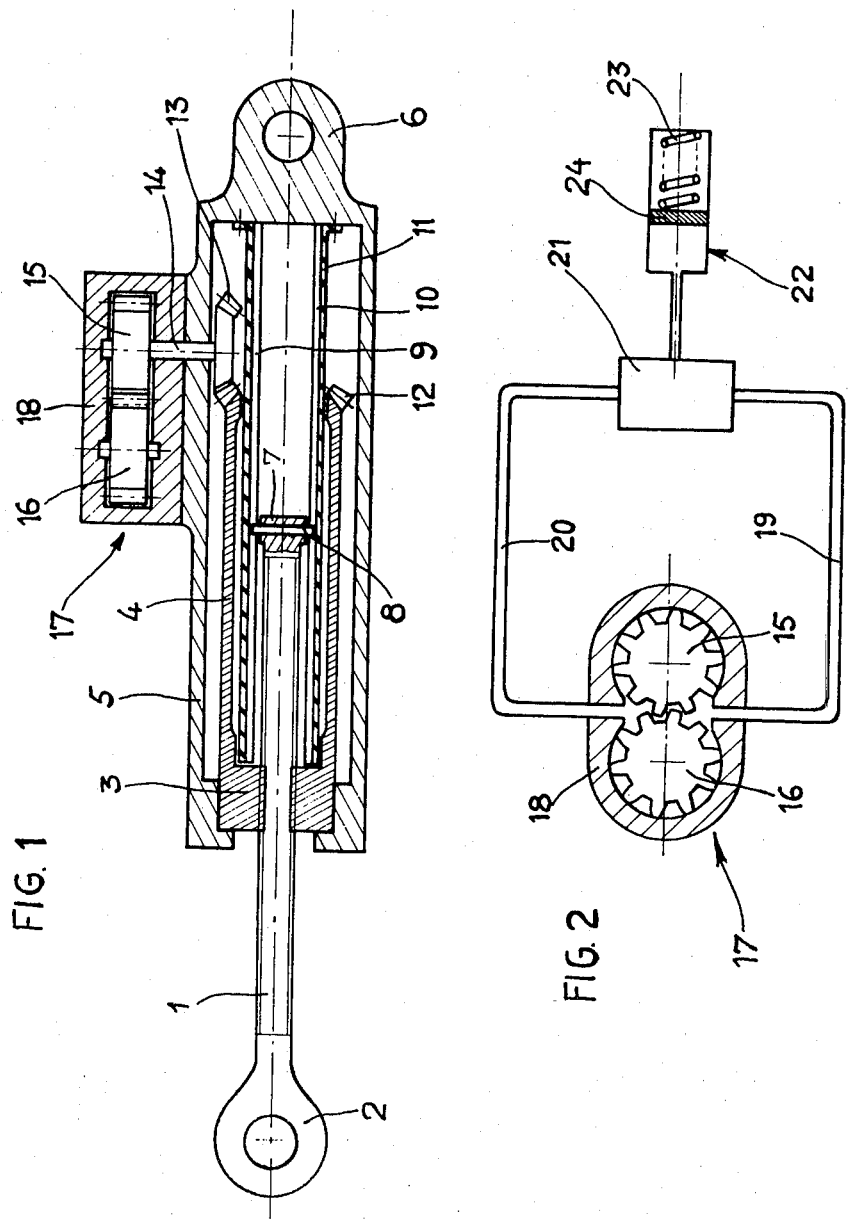
FIG. 1 is a schematic longitudinal section through a mechanical assembly of a damper according to the invention.
FIG. 2 is a schematic view of a hydraulic circuit associated with the mechanical assembly of FIG. 1, to form a damper according to the invention.

Referring firstly to FIGS. 1 and 2, a mechanical-hydraulic damper for a load subjected to shocks and vibrations comprises a screw-nut assembly in which a ball or roller screw 1, carrying a fixing connector 2 for attachment either to the load or to a support is associated with a nut 3 rigid with a generally cylindrical sleeve 4, the nut 3 and the sleeve 4 being mounted to rotate in a body 5 carrying a connector 6 for attachment to the support or to the load. The end of the screw 1 which does not carry the connector 2 is shaped to provide an abutment 7 so that the screw 1 cannot emerge from the nut 3. Traversing the abutment 7 is a pin 8, the ends of which are held in two slides 9 and 10 which are diametrically opposed and provided on the inner face of a guide sleeve 11 rigid with the body 5 and at least partly surrounded by the rotary sleeve 4. That end of the sleeve 4 which is towards the closed end of the body 5 carries a gearwheel 12 which is part of a pair of bevel gears, the other gearwheel 13 being rotationally rigid with a shaft 14 which drives a pinion 15 meshing with an idling pinion 16 of a gear pump 17 housed in an adjacent body 18 fixed to the body 5 by any suitable known means. The pump 17 is a reversible pump, of which the two ports are connected by pipes of short length 19 and 20 to the two ports of a symmetrical control valve 21 communicating with a reservoir 22 of hydraulic fluid pressurised by the action of a spring 23 on a piston 24 inside the reservoir 22. The reservoir 22 supplies hydraulic fluid to the closed and small capacity hydraulic circuit comprising the pump 17, the pipes 19 and 20, the valve 21 and the reservoir 22, this hydraulic circuit being mounted on the body 5 by any suitable known means. Moreover, the reservoir 22 constitutes an accumulator for expansion of hydraulic fluid in the circuit. The control valve 21 includes a passage (not shown) with a calibrated aperture providing communication between the two ports of the valve 21 connected to the pipes 19 and 20. Thus, any movement whereby the load and the support approach each other is translated into a retraction of the screw 1 into the body 5, in relation to which the screw 1 is guided for axial movement by reason of the guide sleeve 11, this axial movement being converted to a rotation of the nut 3, the sleeve 4 and gearwheel 5 which drives the gearwheel 13 and therefore also the gear pump 17. The pump 17 supplies fluid to the valve 21 where the hydraulic fluid is caused to pass through the passage having the calibrated aperture and which serves as a throttling orifice, introducing a hydraulic damping action which opposes the movement of the load and the support towards each other and which is complementary to the inertial damping effect due to the inertia which the mechanical elements of which the device is constituted, particularly those used in conversion of the axial movement into rotation, offer in opposition to this same approaching movement. For movement of the load and support away from each other, the effect would be the same as a movement towards one another due to the reversibility of the functioning of the nut-screw assembly, pump 17 and control valve 21.

In the case of slow deformations, for example of elements adjacent to the load, the inertia of the constituent elements only slightly opposes the movement and the hydraulic braking effect is minimal. Therefore, the device is only opposing low resistance stresses. On the other hand, in the case of movements under considerable acceleration, a blocking reaction develops essentially due to the inertial damping, the hydraulic damping very effectively limiting the speed of displacement under the action of very high stresses. Finally, having regard to the small capacity of the hydraulic circuit, the device has a high degree of rigidity under stress.

Figure 3:
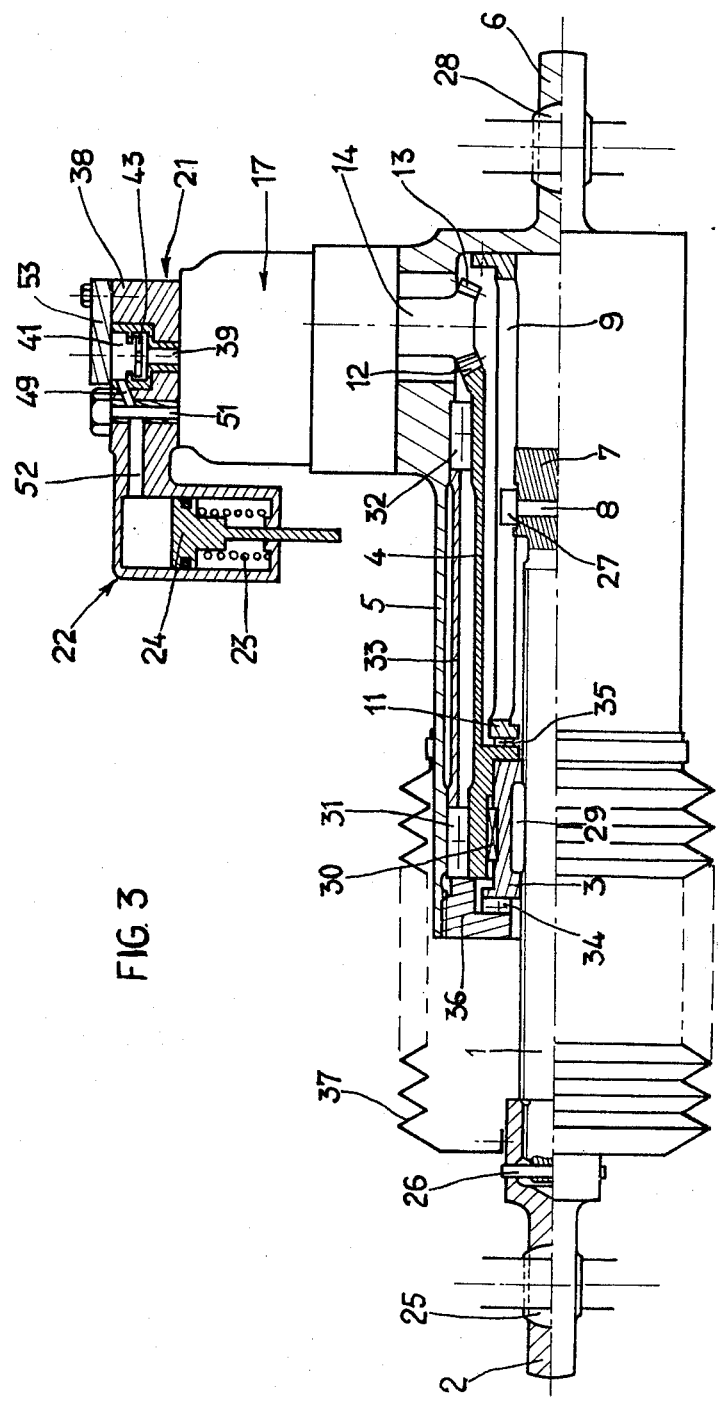
FIG. 3 is a partly sectioned longitudinal view of a practical embodiment of a damper according to the invention.

In the practical embodiment shown in FIGS. 3, 4 and 5, like reference numerals are used for like elements already referred to in connection with the schematic illustrations of FIGS. 1 and 2.

The connector 2, with a ball and socket joint 25 therein, is screwed onto the end of the screw 1 externally of the body 5 and locked by a transverse pin 26. The abutment 7 located at the end of the screw 1 which is inside the body 5 is traversed by a pin 8 on the ends of which are mounted rollers 27 (of which only one can be seen in FIG. 3) which can roll in the two tracks 9 diametrically opposed and provided in the guide sleeve 11 rigid with the body 5. The connector 6 of the body 5 has a ball and socket joint 28 therein. The screw 1 is a screw provided with needle rollers 29 cooperating with the nut 3, connected to the sleeve 4 by a key 30. The assembly comprising the nut 3 and the sleeve 4 is mounted to rotate in the body 5 by means of two needle roller bearings 31 and 32 spaced apart by a spacer 33, and this assembly 3, 4 is positioned axially in the body 5 by means of two needle thrust races 34 and 35, the bearing 31 and the thrust race 34 being held by a plug 36 screwed into a thread on the inside of the body 5, the bearing 32 being held against a shoulder inside the body 5 by the spacer 33 and the thrust race 35 being disposed between a shoulder on the sleeve 4 and the end of the guide sleeve 11. An extensible bellows 37, for example formed of ethylene-propylene, is fixed at one end of the part of the connector 2 which is screwed on the rod 1 and at the other end of the outer surface of the body 5, in order to protect the active part of the roller screw-nut pairing, and the thrust races and bearings, against penetration of dust and other foreign bodies in all the positions of the screw 1 in relation to the body 5.

The bevel pinion 12 carried at the inner end of the rotating sleeve 4 is engaged with the bevel pinion 13 which is connected for rotation with the shaft 14 of the drive pinion of the gear pump 17 carried by the body 5. The control valve 21 is carried by the body 5 and itself carries the reservoir of hydraulic fluid 22 which is a reservoir pressurised under the effect of the spring 23 biassing the internal piston 24 to provide a suitable supply to the hydraulic circuit.

The control valve 21 is a reversible valve comprising a body 38 rigid with the body of the reservoir 22. Provided in the body 38 are two bores 39 and 40 coupled to the two ports of the reversible pump 17 and discharging into two matching bores 41 and 42 respectively of larger diameter in which are accommodated two valves 43 and 44 respectively in which there is a central flow orifice 45 and 46 respectively, the valves 43 and 44 being of a diameter which is smaller than the diameter of the matching bores 41 and 42 and being each mounted floatingly between two abutments 47 and 48. The matching bores 41 and 42 are brought into communication by bores 49 and 50 respectively with a central pipe 51 which is in communication with the pump 17 in order to recover any leakage therefrom, also with a pipe 52 connected to the supply of hydraulic fluid in the reservoir 22. Finally, the matching bores 41 and 42 are occluded by a cover 53 closing the body 38 of the valve 21.

The practical embodiment of FIGS. 3, 4 and 5 functions in an entirely similar manner to the schematically illustrated embodiment of FIGS. 1 and 2. By reason of using a roller screw, however, functioning is improved, particularly in not opposing slow deformations. Furthermore, the control valve 21 makes it possible to obtain effective hydraulic damping in proportion to the square of the speed of hydraulic fluid discharged, for a certain movement of the load and support towards or away from each other, for example through the bore 39 in order to apply the valve 43 against the abutment 47. The flow is thus throttled by the orifice 45 and passes from the bore 41 to the bore 42 through the passages 49 and 50 and the central pipe 51 to apply the valve 44 against the abutment 48 whereupon the flow is again throttled, this time by the orifice 46, and is finally led back to the other port of the pump 17. It will be noted that the hydraulic circuit employed is thus one of small capacity, which will not interfere with satisfactory rigidity of the assembly. Furthermore, the reservoir 22 acts as an accumulator to absorb expansion within the hydraulic fluid.

Figure 6:
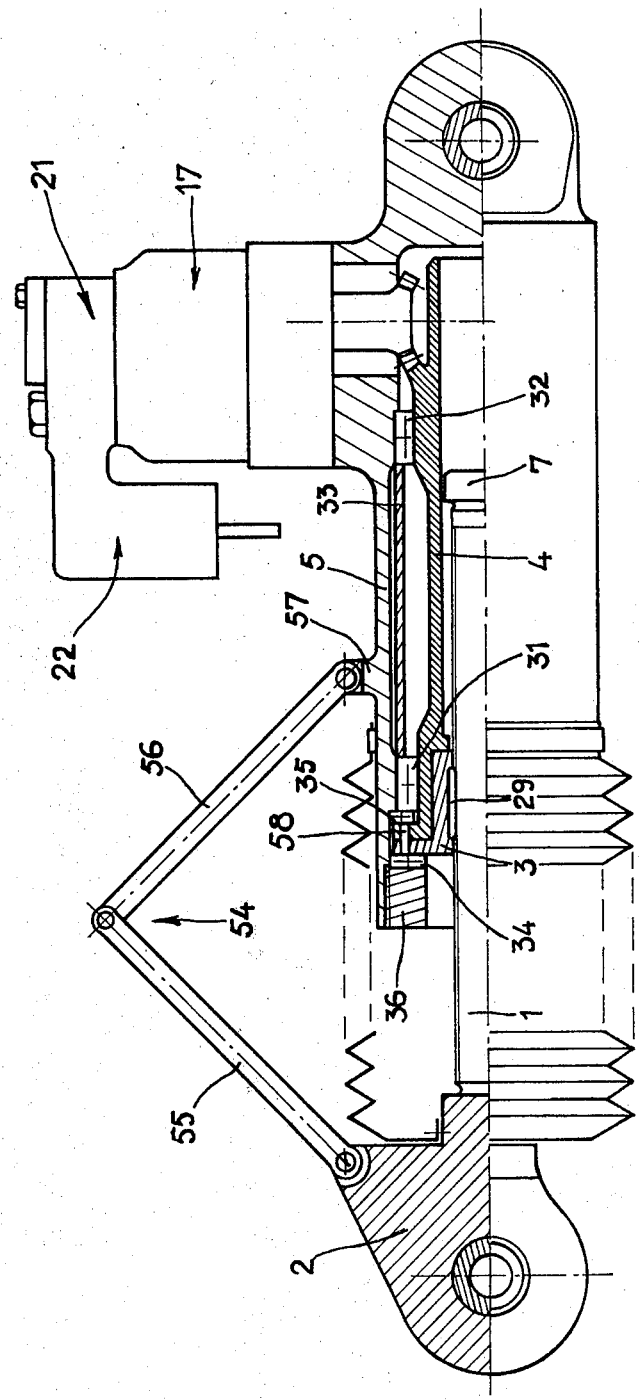
FIG. 6 is a view similar to that of FIG. 3 showing another embodiment of a damper according to the invention.

Referring to FIG. 6, an embodiment which differs essentially from that shown in FIG. 3 by the means of guiding the screw 1 having the needle rollers 29 in the body 5, the abutment 7, disposed at that end of the screw 1 which is inside the body 5, is no longer guided for movement in a guide sleeve within and rigid with the body 5, instead a caliper 54 is provided comprising an arm 55 articulated on the connector 2 outside the body 5, and an arm 56 pivoted to the arm 55 and on a fastening 57 provided on the body 5.

In the absence of a guide sleeve, another disposition of thrust races for the nut 3 and the rotating sleeve 4 must be used. As shown in FIG. 6, the nut 3 and the sleeve 4 each have a radially outwardly extending flange, one adjacent to the other, both being gripped between the needle thrust races 34 and 35 which are held on the one hand by the needle bearing 31, the spacer 33 and the needle bearing 32 bearing against the shoulder on the body 5, and on the other by the plug 36. Moreover, the nut 3 and the sleeve 4 are connected to each other by a pin 58 passing through the adjacent radially outwardly extending flanges.

Other parts of the embodiment of FIG. 6 are identical with those described with reference to FIGS. 3, 4 and 5.

Figure 7:
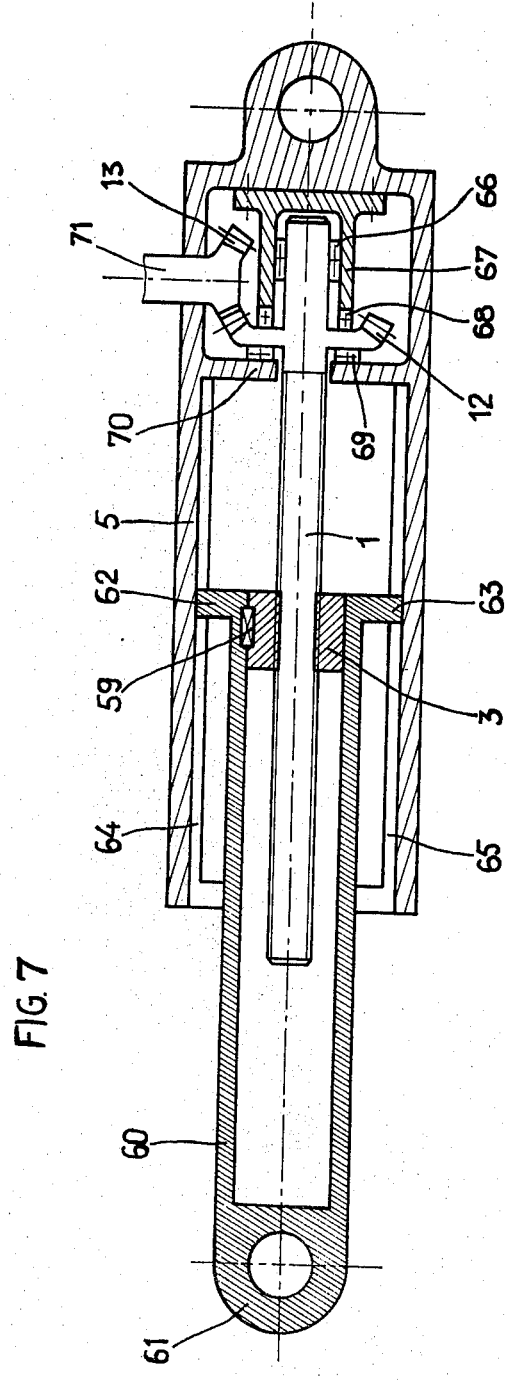
FIG. 7 is a view similar to that of FIG. 1 showing yet another embodiment of a damper according to the invention.
Figure 8:
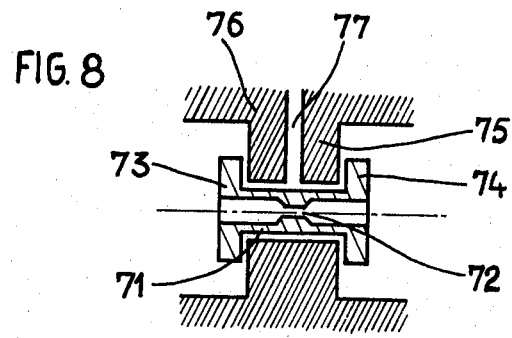
FIGS. 8, 9 and 10 show in cross-section three kinds of control valve which could be incorporated in a damper according to the invention.

FIG. 7 shows an embodiment of a mechanical assembly of a damper in which the screw 1 is mounted to be rotatable in the body 5 and the nut 3 is capable of axial movement. The nut 3 is connected by a key 59 to a sleeve 60, of which the end outside the body 5 carries a connector 61 corresponding to the connector 2.

The sleeve 60 is mounted to slide in the body 5 by two radially outwardly extending lugs 62 and 63 provided on the end of the sleeve 60 which is inside the body 5, and which can slide in respective guide tracks 64 and 65. For its part, the screw 1 carries the gearwheel 12 of a pair of bevel gears, of which the pinion 13 drives the drive shaft of the pump (not shown). The screw 1 thus, together with the gearwheel 12, constitutes an assembly mounted to rotate in the body 5 by means of a bearing 66 disposed between the screw 1 and a sleeve 67 within and rigid with the body 5, and ball or needle thrust races 68 and 69, the race 68 being disposed between the free end of the sleeve 66 and the gearwheel 12 and the race 69 being disposed between the gearwheel 12 and an annular flange 70 projecting radially inwardly from the wall of the body 5. As the hydraulic stage is identical to those previously described, it is evident that any movement of the load towards or away from the support gives rise to an axial movement of the nut 3 in the body 5, this axial movement being converted into a rotation of the screw 1, driving the gearwheel 12 and thus also the pump of the hydraulic stage which, as already stated, produces a hydraulic braking by means of the control valve.

This latter may be constructed in forms other than that described with reference to FIGS. 3, 4 and 5 and FIG. 8 shows a needle valve which may be suitable. The needle valve is constituted in the form of a tubular element 71 provided with a restriction 72 in a bore thereof. The tubular element 71 has two end shoulders 73 and 74 which may separately abut against a restriction 75 in a body 76 of the valve under the thrust of the hydraulic fluid. A pipe 77 discharging at the level of the restriction 75 causes the valve to communicate with the reservoir of hydraulic fluid, which can then circulate in the annular grooves separating the restriction 75 from the tubular element 71 and from its shoulders 73 and/or 74, according to the position of the needle valve, and throttling occurring upon passage through the constriction 72.

Figure 9:
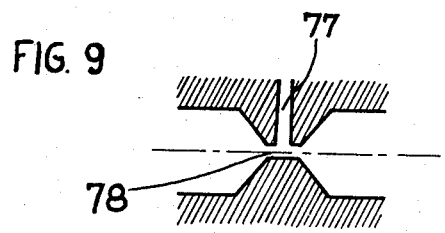

FIG. 9 shows a valve without moving parts constituted in the same way as a venturi tube, the pipe 77 coming from the hydraulic reservoir discharging at the level of a neck 78 through which throttling is achieved.

Figure 10:
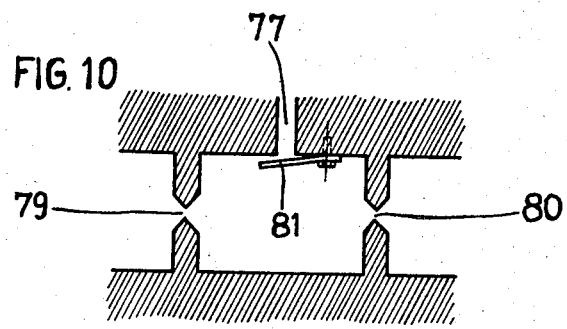

FIG. 10 shows a diaphragm valve in which two identical diaphragms 79 and 80 throttle the hydraulic fluid upstream and downstream of the pipe 77 which is partially occluded by a flexible plate 81 which may, according to the pressures obtaining between the diaphragms 79 and 80 and in the hydraulic reservoir, prevent the return of fluid to the reservoir or allow a supply to ensue therefrom.

It is quite obvious that in conjunction with various kinds of valves, it is possible without departing from the invention to use filters located at different inlets for hydraulic fluid, as well as anti-splash devices. Over and above the advantages already mentioned as being inherent in the invention, the fact of requiring only a single rotating hydraulic seal situated at the point at which the pump drive shaft enters it, makes it possible to reduce the possibilities of leakage to a very low degree.

Finally, it should be noted that other mechanisms than a screw and nut could be used for converting an axial translatory movement into a rotary movement, for example a rack associated with a pinion gear connected to drive the pump.

The embodiment illustrated in FIGS. 11 and 12 comprises a mechanical assembly similar to that described with reference to FIG. 7. Like elements in the two embodiments are identified by like reference numerals.

Figure 11:
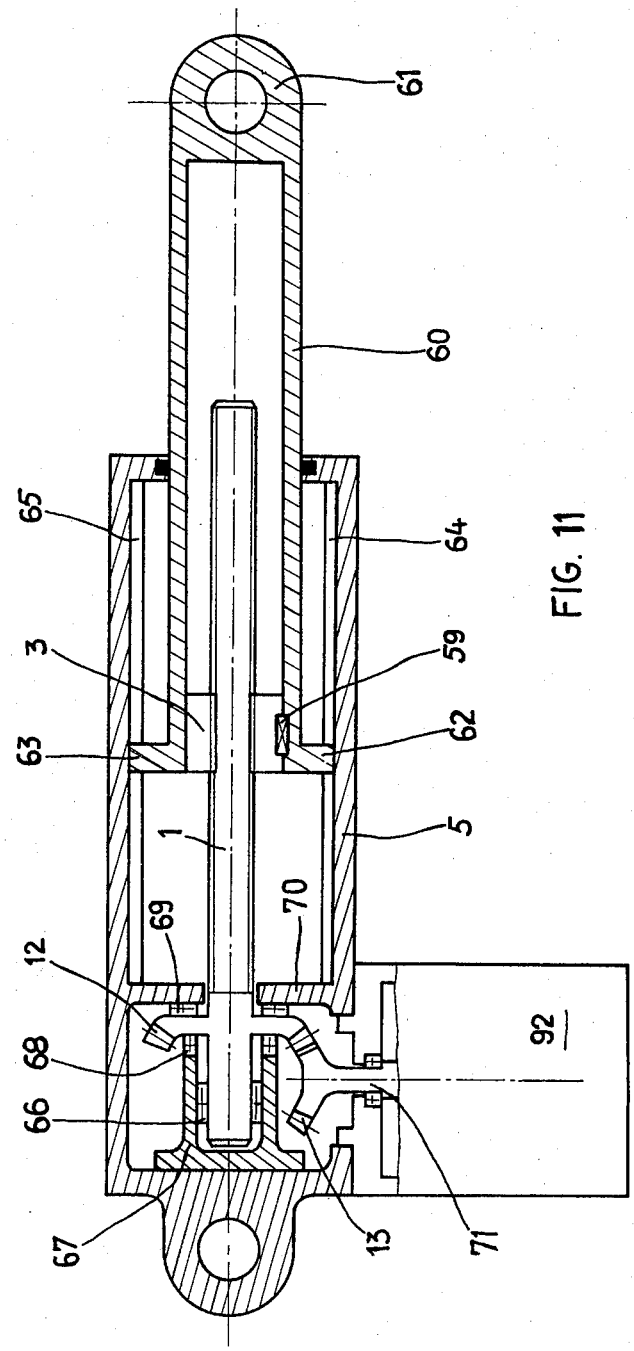
FIG. 11 is a view of the mechanical-hydraulic damper of an alternative embodiment to that shown in FIG. 7 and showing the mechanical assembly in longitudinal section.

The embodiment of FIG. 11 comprises the roller screw 1 mounted to rotate in the body 5 and associated with the nut 3 which is capable of undergoing an axial translatory movement. The nut 3 is connected by the key 59 to the guide sleeve 60, of which the end outside the body 5 carries the connection 61. The sleeve 60 is mounted to slide in the body 5 by means of the two radially outwardly extending lugs 62 and 63 disposed on the end which is within the body 5 of the sleeve 60 and slidably engaged in the tracks 64 and 65. In turn, the screw 1 carries the gearwheel 12 of the pair of bevel gears of which the other 13 drives the shaft 14 of the rotor of a laminar hydraulic brake means 92. The screw 1 thus, together with the gearwheel 12, constitutes an assembly which is mounted to rotate in the body 5 by means of the bearing 66 disposed between the screw 1 and the sleeve 67 disposed within and rigid with the body 5, and the ball or needle thrust races 68 and 69, the first being disposed between the sleeve 67 and the gearwheel 12 and the second between the gearwheel 12 and an annular flange 70 projecting radially inwardly from the wall of the body 5.

With reference to FIG. 12, the laminar hydraulic brake means 92 comprises a rotor 93 coupled to the shaft 14 and contained in a cylindrical reservoir 94 rigid with the body 5 via its base 95. The rotor 93 is in the form of a cylindrical drum open at the bottom and comprising a disc 96 integral with a tubular part 97 which is disposed between the side wall of the cylindrical reservoir 94 and the side wall of a sleeve 98 which is enveloped by the tubular part 97. An end wall 99 integral with the sleeve 98 is rigid with the cylindrical reservoir 94, so that the inner and outer lateral surfaces of the tubular part 97 respectively define with the outer lateral surface of the sleeve 98 and the inner lateral surface of the reservoir 94 small spacings of constant value. The rotor 93 is rotatably mounted in the reservoir 94 via bearings 100 and 101 which bear on the shaft 14 and respectively on the base 95 and end wall 99, and the base 95 is provided with an annular flange 102 housed in a corresponding circular opening in the body 5 so that passages 103 provided in the base 95 ensure permanent communication between the interior of the body 5 and the interior of the cylindrical reservoir 94 which is filled with a high viscosity hydraulic fluid, for example a silicone oil the viscosity of which is between 200 and 1,000,000 centistokes (at a normal temperature of approximately 20° C.). Furthermore, bores 105 are provided in the disc 96 as well as axial bores 105 discharging into radial passages 106 in the end wall 99, to allow a satisfactory supply of viscous hydraulic fluid to the spaces defined between the tubular part 97, the sleeve 98 and the reservoir 94 from a central chamber 107 of the hydraulic reservoir 94.

The mechanical-hydraulic damper of FIGS. 11 and 12 functions in the following manner: any movement of the load towards or away from the support, to which the damper is connected by the connectors situated one at the end of the body 5 and the other 61 at the end of the guide sleeve 60, will give rise to an axial translatory movement of the nut 3 in the body 5, the said translatory movement being converted into a rotation of the screw 1 driving the gearwheel 12 and thus also, through the pinion 13 and the shaft 14, the rotor 93, giving rise to a laminar hydraulic damping action, the viscous fluid in the spaces defined between the tubular part 97, the sleeve 98 and the reservoir 94 opposing relative rotary movements of the surfaces which are close one to the other and between which it is located, in accordance with a well-known phenomenon.

This hydraulic damping is added to the inertial damping due to the inertia of which the mechanical elements of which the device is constituted, particularly those involved in conversion of axial translatory movement to rotation, offer in opposition to the movement of the load and the support towards or away from each other.

It will be noted that permanent communication between the hydraulic reservoir 94 and the interior of the body 5 allows the body 5 to act as an expansion vessel and an accumulator for expansion of the viscous fluid due to temperature variations.

Furthermore, it is advantageous to dispose inside the body 5 a sufficient reserve of viscous fluid for the mechanical-hydraulic damper to be disposed in a horizontal position, the reservoir 94 being directed downwardly, or in a vertical position, and for the supply of viscous fluid to the laminar hydraulic damper 92 always to be satisfactorily ensured.

However, if it is desired to be able to locate the device in a horizontal position in which the reservoir 94 is directed upwardly, it will be advisable not to provide a passage 103 in the base 95 and to mount a fluid-tight seal on the shaft 14 at its exit from the reservoir 94, at the level of the bearing 100 for example.

Finally, it is evident that the mechanical-hydraulic damper according to the invention can have excellent characteristics of compactness and rigidity having regard to the small volume of fluid involved and the disposition of the hydraulic device in relation to the mechanical assembly.

What is claimed is:

1. A mechanical-hydraulic damper for a load which is subject to shocks and vibrations, comprising a co-operating pair of elements including a ball or roller screw and a nut, a first element of said pair of elements being mounted in a body for relative axial movement in relation to said body and the second element of said pair of elements being rotatably mounted in said body and so coupled to said first element that relative axial movement of said first element causes rotation of said second element, with said second element being coupled to hydraulic means which resist sudden or rapid rotation of said second element including drive means comprising a reversible pump to cause flow of hydraulic fluid around a closed hydraulic circuit mounted on said body, the rate of flow of fluid being restricted by a calibrated orifice comprising a reversible symmetrical control valve in communication with a reservoir of hydraulic fluid, the outlet of which is coupled to a fluid inlet at the middle of said symmetrical control valve, whereby the mechanical-hydraulic damper functions to damp successive shocks and vibrations in the same or reverse directions.

2. A mechanical-hydraulic damper as claimed in claim 1, wherein said pump is directly driven by said second element which is mounted to rotate in said body.

3. A mechanical-hydraulic damper as claimed in claim 1, wherein said pump is driven by said second element which is mounted to rotate in said body through at least one pair of gears.

4. A mechanical-hydraulic damper as claimed in claim 1, wherein said first element is guided for axial movement in relation to said body by guide tracks.

5. A mechanical-hydraulic damper as claimed in claim 1, wherein said first element is guided for axial movement in relation to said body by means of a key and key way.

6. A mechanical-hydraulic damper as claimed in claim 1, wherein said first element is guided for axial movement in relation to said body by means of a caliper.

7. A mechanical-hydraulic damper as claimed in claim 1, wherein said pair of elements comprises a screw and a nut, said screw is guided for axial movement in relation to said body and wherein said nut is mounted to rotate in said body and is rigid with a sleeve rotatable in said body and coupled to said drive means for said hydraulic circuit.

8. A mechanical-hydraulic damper as claimed in claim 1, wherein said pair of elements comprises a screw and a nut, said screw is mounted to rotate in said body, said nut is rigidly coupled to a sleeve guided for axial movement in relation to said body and said screw is coupled to said drive means of said hydraulic circuit.

* * * * *